Patented Oct. 24, 1939

2,177,336

UNITED STATES PATENT OFFICE 2,177,336

GLASS VESSEL

William W. Shaver and Harold Kaye Martin, Corning, N. Y., assignors to Corning Glass Works, Corning, N. Y., a corporation of New York No Drawing. Application July 1, 1935, Serial No. 29,421

8 Claims. (Cl. 49—92)

This invention relates to glass vessels and more particularly to vessels employed for domestic purposes such as glass baking dishes.

Glass vessels of the type above referred to composed of low expansion glass have been known and used for many years and have found wide application and favor throughout the whole civilized world. One of the primary objections to such articles, however, has been their great weight, that is, wall thickness, and the consequent difficulty of handling. This has been due to the necessity of providing mechanical strength and also to the fact that low expansion glasses as a rule when molten and at a temperature suitable for working are relatively stiff and will not flow freely enough to permit ware to be pressed thin. Moreover, the ingredients entering into the composition are relatively high priced with the result that the cost of producing such ware is greater than it would be for similar ware made from glass in which cheaper ingredients are used.

Heating vessels made from glass which flows more freely when molten and consequently is capable of being pressed thin, have not heretofore been practicable even though of a cheaper composition due to the fact that the coefficient of expansion of the glass is high and the thermal endurance so low that a vessel made therefrom would not stand the service to which such articles are subjected. Moreover, its mechanical impact strength is reduced and consequently such thin glass heating vessels or baking dishes will not stand the rough handling that the baking ware now on the market will endure.

It has long been known that both the thermal endurance and mechanical strength of glass could be increased by tempering and as a consequence tempered glass articles have found their way into commerce as is evidenced by the issue on August 25, 1931, of Patent No. 1,820,601, to Despret, and the recent appearance on the market of tempered glass tumblers, tempered glass lenses for goggles, etc. However, the tempering heretofore generally employed, while increasing both the mechanical strength and thermal endurance of the article, is such that when the article breaks it shatters into a great number of very small pieces. In fact, such highly tempered containers of glass break with a fracture which simulates an explosion and the small fragments and glass particles into which it divides itself fly in all directions. Obviously glass heating vessels or baking dishes which have been tempered in accordance with the teachings of the prior art, while possessing a high degree of thermal endurance and mechanical strength, become a hazard when employed in domestic service as particles of glass from a dish which does break are apt to contaminate food and cause injury and even death unless all uncovered food in the room in which the breaking of the dish occurs is destroyed.

The primary object of this invention is to permit the manufacture of lighter weight heating vessels than have heretofore been employed.

Another object is to reduce the cost of production of glass heating vessels without sacrificing thermal endurance and mechanical strength.

Still another object is to obtain maximum thermal endurance of glass heating vessels without introducing the hazard of explosive fracture when the vessel does break.

The above and other objects may be accomplished by employing our invention which embodies among its features forming a glass vessel of the desired shape and so tempering it that its tension per square millimeter lies below a predetermined limited degree at which explosive fracture would occur, but above a value which will give the vessel a thermal endurance greater than a like but annealed vessel made from a low expansion glass.

More specifically, our invention resides in a tempered glass article in which the maximum degree of tension per square millimeter does not exceed the value given by the equation:

$$T = \sqrt{\frac{(2n+1)Ef}{(1-y)n^2}} \left[ \frac{1}{65.6 - 1.43t + .435t^2 - .00992t^3} \right]$$

in which $T$ is the maximum tension, $n$ is the ratio of maximum compression to maximum tension, $E$ is the modulus of elasticity, $f$ is the mechanical strength of the glass, $y$ is the ratio of contraction to extension in a stretched body, and $t$ is the glass thickness.

In carrying our invention into practice, a glass article, for example a three pint baking dish about one-fourth inch thick composed of a borosilicate glass corresponding to composition D of the Sullivan and Taylor Patent No. 1,304,623, dated May 27, 1919, and possessing a modulus of elasticity of 6310 to 6470, a tensile strength of 4.70 and 5.00, and a ratio of contraction to extension in a stretched body (Poisson's ratio) of 0.2, is heated to a temperature at or near the softening point of the glass, i. e., about 810 degrees C. The article is held at this temperature for a period of time sufficient for its temperature to reach substantial equilibrium throughout, at which time the heating is discontinued, and the article is immediately subjected to a chilling operation which may take the form of a liquid chilling bath, or a blast of air. If a liquid chilling bath is used, such as a bath composed of the eutectic mixture of sodium nitrate and potassium nitrate, it is heated to a temperature of 285° C. in order to avoid setting too severe a strain in the glass, i. e., a strain which would cause the glass to break with an explosive fracture. If, on the other hand, the chilling bath is composed of a heavy oil such as that commonly known as 600W, the temperature of the bath will be 200° C. Tests have shown that for a glass dish of the dimensions and composition above recited, the actual tension per square millimeter will not exceed 2.6 kilograms and even though the article exhibits mechanical strength to the extent of twice that of a like but annealed article, when broken it does not break with an explosive fracture but the break resembles very closely that of an annealed glass article. The thermal endurance of a dish so treated has been found to be at least twice that of a like but annealed dish and yet breakage from thermal causes of a piece so tempered is not unlike that experienced when an annealed piece of like dimensions and glass composition breaks from thermal causes.

Experience has taught that not only borosilicate glasses of the type referred to can be made to possess greater mechanical and thermal strength through limited tempering but that the tempering of lime and other glasses to a predetermined limited degree can be practiced with equally satisfactory results. As in our experiments with borosilicate glass, so also in the case of lime glasses we have found it convenient to employ three pint baking dishes about one-fourth inch thick and composed of a glass having a composition substantially as follows:

| | |
|---|---|
| SiO$_2$ | 72.86 |
| R$_2$O$_3$ (impurities) | 1.37 |
| Na$_2$O | 16.29 |
| K$_2$O | 1.65 |
| CaO | 5.00 |
| MgO | 3.36 |
| B$_2$O$_3$ | 0.56 |

Such a glass is commonly known as a lime glass, has a linear coefficient of thermal expansion of 0.00000935 per degree centigrade, and softens at about 695° C. Its modulus of elasticity is 6860 kilograms per square millimeter and its tensile strength is 3.3 kilograms per square millimeter. In our experiments such lime glass articles of the above named dimensions were heated to a temperature of 695° C. for a period of ten minutes or until the articles reached substantially equilibrium temperature throughout and immediately plunged them into a sodium nitrate and potassium nitrate chilling bath which was held at a temperature of about 405° C. This produced a tempered glass article which while having a thermal endurance of 170° C. which exceeds that of a similar dish of annealed borosilicate glass of the composition above recited and a mechanical strength which is about twice as great as that of the aforesaid annealed borosilicate dish, yet when broken produces a non-explosive fracture or one very closely resembling that produced in an annealed dish.

Further experiments on dishes made from glasses of widely differing composition and physical characteristics have proven that by semi-tempering or tempering glass dishes below a predetermined degree of tension, i. e., that recited in the following formula:

$$T = \sqrt{\frac{(2n+1)Ef}{(1-y)n^2}} \left[ \frac{1}{65.6 - 1.43t + .435t^2 - .00992t^3} \right]$$

in which T is the maximum tension in kilograms per square millimeter, $n$ is the ratio of maximum compression to maximum tension, E is the modulus of elasticity in kilograms per square millimeter (Young's modulus), $f$ is the tensile strength of the glass in kilograms per square millimeter, $y$ is the ratio of contraction to extension in a stretched body (Poisson's ratio), and $t$ is the thickness of the glass in millimeters, we are able to obtain mechanical and thermal strengths which are not present in like pieces which have been annealed and yet the type of break when such does occur is not of an objectionable character such as is experienced when no upper tempering limit is employed.

In United States Letters Patent No. 1,304,623, issued May 27, 1919, to Sullivan and Taylor, there is given in detail a discussion of thermal endurance of glass expressed by Winklemann and Schott (Ann. d. Phys. u. Chem. 51—730 (1894); and also Hovestadt, Jena Glass, published by MacMillan 1902, p. 228); and by employing the Winklemann and Schott method of calculation it was found that the glasses of the Sullivan and Taylor patent above referred to had a cubic coefficient of thermal endurance of $$\left(\frac{F}{3}\right)$$

greater than 6. A glass article made from such glass, for instance a three pint casserole, has an actual thermal endurance of 160° C. as represented in a standard test which consists in heating the article in an oven and then plunging it into ice water the temperature of which is about 3° C. to 7° C. In conducting such tests the articles are heated to progressively increasing temperatures in the oven and plunged into the ice water as described and the thermal endurance of the articles is said to be that oven temperature at which on the average the articles will break when subjected to such treatment. Ware produced in accordance with the methods disclosed herein and then subjected to the thermal endurance test above described has been found to have a thermal endurance of not less than 120° C. and three pint casseroles produced from a low expansion borosilicate glass and semi-tempered as herein described, when tested as above, have been found to possess thermal endurances of 320° C. and upwards.

By the term "thermal endurance" as herein employed, we means the highest temperature to which a glass vessel may be heated and then plunged into ice water without breaking.

By the term "tempered glass" we mean glass that has been submitted to a heat treatment such as to induce in the glass a stress system which, when the glass is cooled below its strain point, it is permanent, and of such magnitude and allocation as to substantially increase the strength over that which the glass would normally possess without such tempering.

Semi-tempered is used herein as defining a tempering of such character that the resultant stress system has a potential energy less than that existing at the limit when it breaks into pieces less than one-half inch square, but substantially more than that possessed by untreated glass.

Explosive fracture is used herein as defining the result of that state of tempering at which the glass is endowed with a stress system potential energy sufficient to break it into pieces approximately one-half inch square when drilled at the center of a face.

What is claimed is:

1. As a new article of manufacture, a glass vessel having its surface layers under compression and an inner tension zone the maximum degree of tension of which per square millimeter does not exceed the value given by the equation $$T \text{ equals } \sqrt{\frac{(2n+1)Ef}{(1-y)n^2}} \left[\frac{1}{65.6 - 1.43t + .435t^2 - .00992t^3}\right]$$

in which T is the maximum tension in kilograms per square millimeter, $n$ is the ratio of maximum compression to maximum tension, E is the modulus of elasticity in kilograms per square millimeter, $f$ is the tensile strength of the glass in kilograms per square millimeter, $y$ is the ratio of contraction to extension in a stretched body, and $t$ is the thickness of the glass in millimeters.

2. As a new article of manufacture, a glass vessel having a thermal endurance of at least 120° C. imparted to it by having its surface layers under compression which compression is balanced by tension in an inner zone the degree of tension in said inner zone not exceeding the value given by the equation $$T \text{ equals } \sqrt{\frac{(2n+1)Ef}{(1-y)n^2}} \left[\frac{1}{65.6 - 1.43t + .435t^2 - .00992t^3}\right]$$

in which T is the maximum tension in kilograms per square millimeter, $n$ is the ratio of maximum compression to maximum tension, E is the modulus of elasticity in kilograms per square millimeter, $f$ is the tensile strength of the glass in kilograms per square millimeter, $y$ is the ratio of contraction to extension in a stretched body, and $t$ is the thickness of the glass in millimeters.

3. As a new article of manufacture, a glass vessel having a wall thickness of not more than one-fourth of an inch and having its surface layers under compression and an inner zone under tension the degree of tension per square millimeter of which does not exceed the value given by the equation $$T \text{ equals } \sqrt{\frac{(2n+1)Ef}{(1-y)n^2}} \left[\frac{1}{65.6 - 1.43t + .435t^2 - .00992t^3}\right]$$

in which T is the maximum tension in kilograms per square millimeter, $n$ is the ratio of maximum compression to maximum tension, E is the modulus of elasticity in kilograms per square millimeter, $f$ is the tensile strength of the glass in kilograms per square millimeter, $y$ is the ratio of contraction to extension in a stretched body, and $t$ is the thickness of the glass in millimeters.

4. As a new article of manufacture, a glass vessel having a wall thickness of not more than one-fourth of an inch and a thermal endurance of not less than 120° C. imparted to it by having its surface layers under compression and an inner zone under tension the degree of tension per square millimeter of which does not exceed the value given by the equation $$T \text{ equals } \sqrt{\frac{(2n+1)Ef}{(1-y)n^2}} \left[\frac{1}{65.6 - 1.43t + .435t^2 - .00992t^3}\right]$$

in which T is the maximum tension in kilograms per square millimeter, $n$ is the ratio of maximum compression to maximum tension, E is the modulus of elasticity in kilograms per square millimeter, $f$ is the tensile strength of the glass in kilograms per square millimeter, $y$ is the ratio of contraction to extension in a stretched body, and $t$ is the thickness of the glass in millimeters.

5. As a new article of manufacture, a glass vessel having its surface layers under compression and an inner tension zone the maximum degree of tension of which per square millimeter does not exceed 2.6 kilograms.

6. As a new article of manufacture, a glass vessel having a thermal endurance of at least 120° C. imparted to it by having its surface layers under compression which compression is balanced by tension contained within an inner zone the value of which does not exceed 2.6 kilograms per square millimeter.

7. As a new article of manufacture, a glass vessel having a wall thickness of not more than one-fourth of an inch and having its surface layers under compression which compression is balanced by tension in an inner zone the degree of tension per square millimeter of which does not exceed 2.6 kilograms.

8. As a new article of manufacture, a glass vessel having a wall thickness of not more than one-fourth of an inch and a thermal endurance of not less than 120° C. imparted to it by having its surface layers under compression which compression is balanced by tension in an inner zone the degree of tension per square millimeter of which does not exceed 2.6 kilograms.

WILLIAM W. SHAVER.
H. KAYE MARTIN.